United States Patent [19]
Chen et al.

[11] Patent Number: 6,130,830
[45] Date of Patent: Oct. 10, 2000

[54] SYSTEM AND METHOD FOR PARALLELING POWER CONVERTER SYSTEMS AND POWER SUPPLY EMPLOYING THE SAME

[75] Inventors: Qing Chen, Plano; Del Ray Hilburn, Mesquite, both of Tex.

[73] Assignee: Lucent Technologies Inc., Murray Hill, N.J.

[21] Appl. No.: 09/247,005

[22] Filed: Feb. 8, 1999

[51] Int. Cl.[7] .................................................. H02M 7/04
[52] U.S. Cl. .................................................. 363/65
[58] Field of Search ................... 363/65, 67, 69, 363/70, 71; 307/58, 82

[56] References Cited

U.S. PATENT DOCUMENTS

| | | | |
|---|---|---|---|
| 4,598,352 | 7/1986 | Narvhus et al. | 363/69 |
| 5,768,117 | 6/1998 | Takahashi et al. | 363/65 |
| 5,796,601 | 8/1998 | Yamamoto | 363/84 |
| 5,905,645 | 5/1999 | Cross | 363/65 |

*Primary Examiner*—Matthew Nguyen

[57] ABSTRACT

An interface circuit for, and method of, allowing first and second power converter systems to function in parallel and a power supply incorporating the controller or the method. In one embodiment, the interface circuit includes: (1) a set point selection circuit, coupled to first and second converter controllers of the first and second power converter systems, respectively, that selects one of the first and second power converter systems to provide a global set point voltage signal and (2) a bus, coupled to the set point selection circuit, that conveys the global set point voltage signal to the first and second power converter systems, the set point selection circuit isolating a nonselected one of the first and second converter controllers from the bus.

20 Claims, 3 Drawing Sheets

SYSTEM AND METHOD FOR PARALLELING POWER CONVERTER SYSTEMS AND POWER SUPPLY EMPLOYING THE SAME

TECHNICAL FIELD OF THE INVENTION

The present invention is directed, in general, to power conversion and, more specifically, to a system and method for paralleling power converter systems (which each contain multiple individual power converters) and a power supply employing the system or the method.

BACKGROUND OF THE INVENTION

Power converter systems often employ individual power converters coupled in parallel to provide flexibility, modularity and redundancy. As overall load current requirements change, individual power converters can be added, removed or replaced without replacing the entire power system. Similarly, if an individual power converter fails, it can be replaced as a module.

One of the major concerns regarding proper operation of paralleled power converters is the ability to balance load currents between the power converters. For example, if a power converter system contains two power converters operating in parallel, each power converter is typically tasked to deliver one half of the total load current. If one of the power converters fails to deliver its allotted portion of the total load current, the other power converter is called upon to compensate for the shortfall. There has been extensive research on how to control load sharing among converters, and many control schemes have been developed. These methods are widely used in the power electronic industry, and prove to suffice in many applications.

In a distributed power system, sometimes there is a need to parallel several converter sub-systems, where each consists of several DC-DC converters. This further complicates the problem since each sub-system has its own voltage set point, which is typically used to control the value of its own output voltage. Slight differences among these voltage set points, often due to circuit component tolerances in the sub-systems, would then result in large output voltage imbalances among the DC-DC converters. Therefore, it is usually necessary to use one of the control signals to set the output voltage of the DC-DC converters. This control signal may be obtained from a control bus which is formed by using the voltage set point signal from each converter subsystem to form a logical "OR" circuit.

A conventional way of forming a logical OR circuit for voltage signals uses diodes for implementation. The problem associated with using diodes to form a logical OR circuit is that voltage adjustment is unidirectional, allowing the converter voltage to be only margined up or only margined down. In many practical applications, however, the control circuit has to have the capability to both margin up and margin down, thereby adjusting the output voltage in either direction.

Another important aspect of the output voltage control system is its robustness against failure. In a typical distributed power system, a single control signal failure may bring down the whole system of paralleled DC-DC converters. This occurs because conventional methods, used to select one of the control systems, are sensitive to the other control signals if they should become faulted.

Accordingly, what is needed in the art is a way to conveniently orchestrate the output voltages of paralleled converters in a fault tolerant manner while maintaining the capability of adjusting the output voltage in either direction.

SUMMARY OF THE INVENTION

To address the above-discussed deficiencies of the prior art, the present invention provides an interface circuit for, and method of, allowing first and second power converter systems function in parallel and a power supply incorporating the interface circuit or the method. In one embodiment, the interface circuit includes: (1) a set point selection circuit, coupled to first and second converter controllers of the first and second power converter systems, respectively, that selects one of the first and second power converter systems to provide a global set point voltage signal and (2) a bus, coupled to the set point selection circuit, that conveys the global set point voltage signal to the first and second power converter systems, the set point selection circuit isolating a nonselected one of the first and second converter controllers from the bus.

The present invention therefore introduces the broad concept of (1) selecting one converter controller to control multiple power converter systems based on relative set point voltage values and (2) isolating (by way of a high impedance, in an embodiment to be illustrated and described) the nonselected converter controller from the remainder of the system to render the remainder resistant or immune to failure of the nonselected one.

In one embodiment of the present invention, the global set point voltage signal is an analog signal. Of course, the global set point signal may be digital. In an embodiment to be illustrated and described, the analog signal is advantageously employed to control individual DC-DC power converters provided within the first and second power converter systems.

In one embodiment of the present invention, a top level controller is coupled to both the first and second converter controllers. The top level controller provides a margin up/down signal to each of the first and second converter controllers. In an embodiment to be illustrated and described, the top level controller manages the overall power supply. The converter controllers in each of the first and second power converter systems manage DC-DC power conversion carried out therein.

In one embodiment of the present invention, the top level controller further includes a battery monitoring circuit that monitors characteristics of a battery. The characteristic may be a voltage, current, temperature or any other attribute that may be of value in operating the power supply.

In one embodiment of the present invention, each of the first and second power converter systems comprises at least two DC-DC power converters. In an embodiment to be illustrated and described, each power converter system consists of four power converters.

In one embodiment of the present invention, each of the first and second converter controllers controls multiple DC-DC power converters contained in the first and second power converter systems, respectively.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
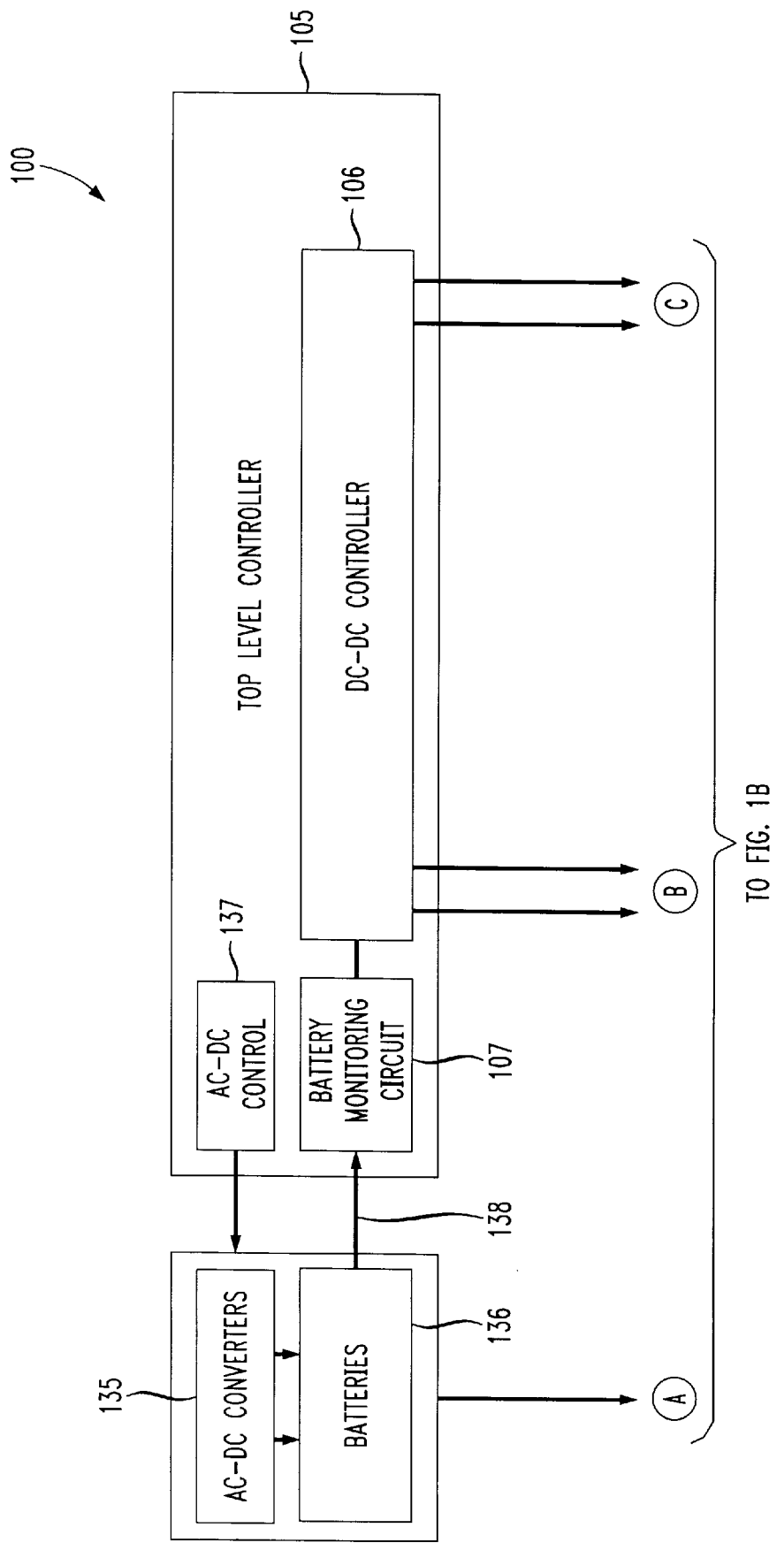
FIG. 1 illustrates a block diagram of an embodiment of the present invention showing a power supply system.
Figure 1B:
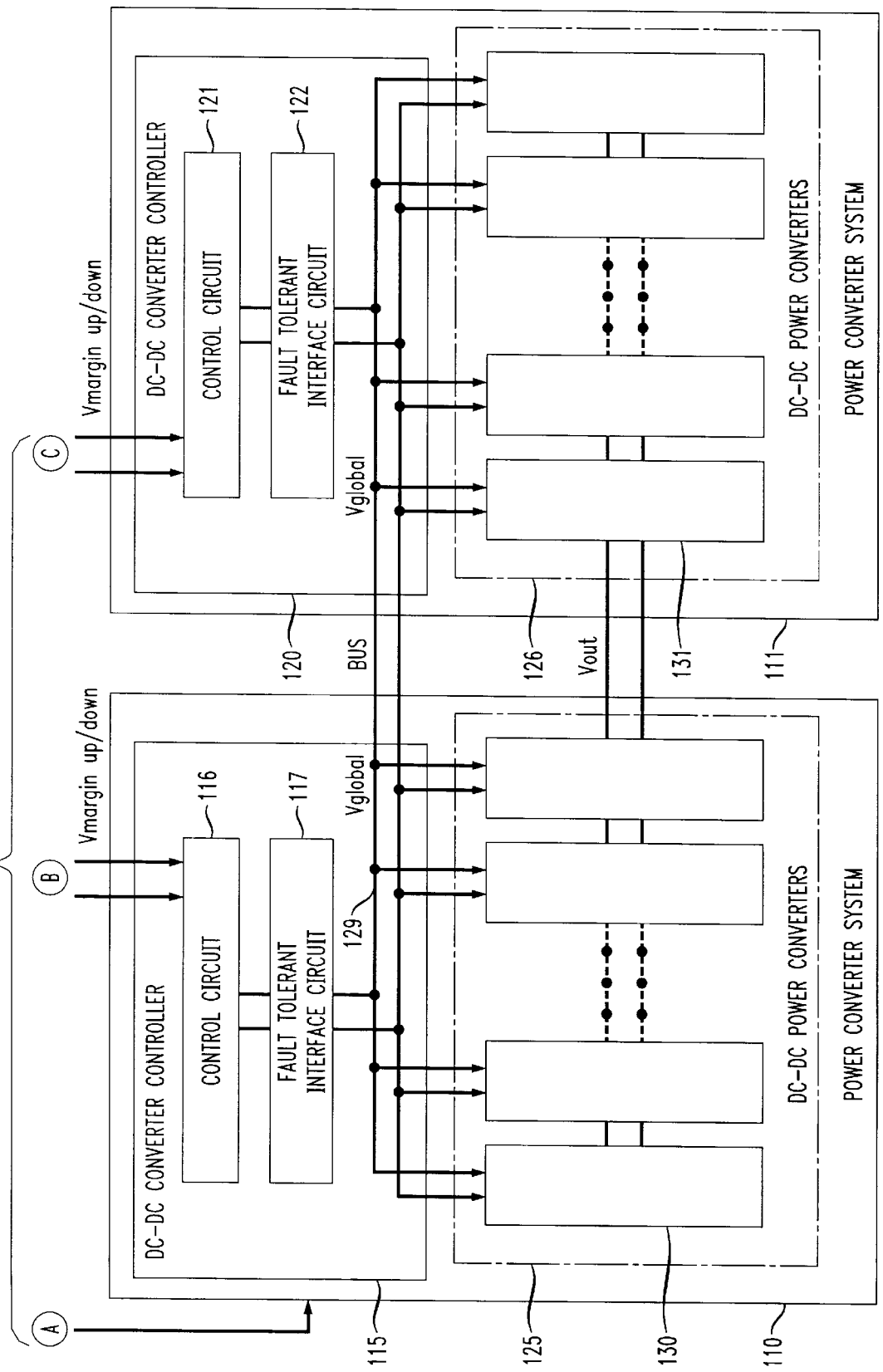

Referring initially to FIG. 1, illustrated is a block diagram of an embodiment of the present invention showing a power supply system 100. The power supply system 100 includes a top level controller 105, a first power converter system 110 and a second power converter system 111. The top level controller 105 includes a DC-DC controller 106, a battery monitoring circuit 107 and an AC-DC control 137. The first power converter 110 includes a first DC-DC converter controller 115 and a first set of DC-DC power converters 125. The second power converter system 111 includes a second DC-DC converter controller 120 and a second set of DC-DC power converters 126. Further, the power supply system 100 also includes AC-DC converters 135 and batteries 136.

The first power converter system 110, which typically has at least two DC-DC power converters 130, is controlled by a first DC-DC converter controller 116 that is coupled to a first fault tolerant interface circuit 117. The second power converter system 111, which also typically has at least two DC-DC power converters 131, is controlled by a second DC-DC converter controller 121 that is coupled to a second fault tolerant interface circuit 122. The first and second fault tolerant interface circuits 117, 122 are used to operate the first and second power converter systems 110, 111 in parallel and contain a set point selection circuit (not shown in FIG. 1, but to be illustrated in FIG. 2) that provides a global set point voltage signal $V_{global}$ to the first and second power converter systems 110, 111. The global set point voltage signal $V_{global}$ is applied to a bus 129 that conveys the global set point voltage signal $V_{global}$ to the first and second sets of DC-DC power converters 125, 126. The set point selection circuit also isolates a nonselected one of the first and second DC-DC converter controllers 116, 121 from the bus 129.

In the current embodiment of the present invention, the global set point voltage signal $V_{global}$ is an analog signal. Of course, the global set point signal $V_{global}$ may be digital. The analog global set point voltage signal $V_{global}$ may be advantageously employed to control the individual DC-DC power converters 130, 131 provided within the first and second power converter systems 110, 111.

The present invention provides an interface circuit for, and method of, allowing the first and second power converter systems 110, 111 to function in parallel and introduces the broad concept of selecting one converter controller to control multiple power converter systems based on relative set point voltage values. The illustrated embodiment controls multiple power converter sub-systems based on the higher one of the voltage set points developed within the sub-systems and distributes the higher set point to each of the sub-systems with a bus that resists or, in some embodiments, may be completely immune to converter controller failure. Therefore, isolation of the nonselected converter controller from the remainder of the system is provided to render the remainder resistant or immune to failure of the nonselected converter controller. Of course, the broad concept also applies to the selection of the lower one of the set points if desired.

The top level controller 105 is coupled to both the first and second converter controllers 116, 121. The top level controller 105 provides a margin up/down signal $V_{margin\ up/down}$ to each of the first and second converter controllers 116, 121. The margin up/down signal $V_{margin\ up/down}$ allows the outputs of the paralleled first and second sets of DC-DC power converters 125, 126 to be adjusted together over a certain range. The top level controller 105 also manages AC-DC conversion, in the overall power supply, through control of the AC-DC converters 135. The battery monitoring circuit 107, included in the top level controller 105, monitors characteristics of the batteries 136 that are coupled to the top level controller 105 and may be coupled to the first and second power converter systems 110, 111. The monitored characteristics may be a voltage, a current, a temperature and/or any other attribute that may be of value in operating the power supply system 100.

Figure 2:
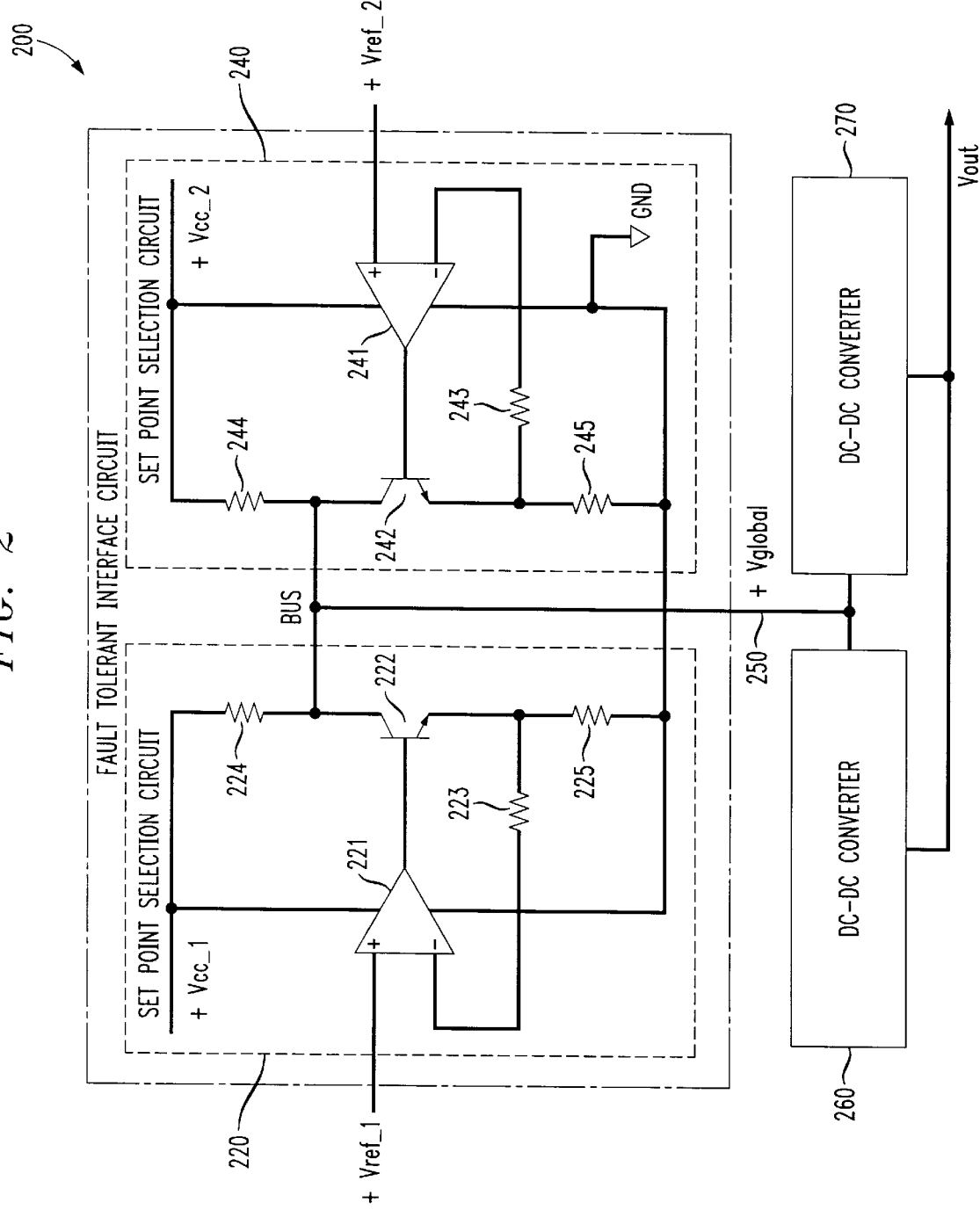
FIG. 2 illustrates a schematic diagram showing an embodiment of a fault tolerant interface circuit.

Turning now to FIG. 2, illustrated is a schematic diagram showing an embodiment of a fault tolerant interface circuit 200. The fault tolerant interface circuit 200 includes a first set point selection circuit 220 and a second set point selection circuit 240 that are identical and coupled together at their outputs in a sufficiently high impedance connection. The first set point selection circuit 220 includes a first amplifier 221, a first output transistor 222 and first, second and third resistors 223, 224, and 225. The second set point selection circuit 240 also includes a second amplifier 241, a second output transistor 242 and first, second and third resistors 243, 244, and 245.

Both the first and second set point selection circuits 220 and 240 function in a similar manner. The first and second set point selection circuits 220, 240 employ the first and second amplifiers 221, 241 connected in concert with the first and second output transistors 222, 242, respectively. Then, connecting the outputs of the first and second output transistors 222, 242 together conveys the greater one of the first or second reference input voltage $V_{ref\_1}$, $V_{ref\_2}$ to a bus 250. The bus 250 thereby provides a global set point voltage signal $V_{global}$ to the parallel coupled first and second DC-DC converters 260, 270.

If the second reference input voltage $V_{ref\_2}$ is the greater one of the two reference signals, the output transistor 242 will be essentially in saturation with both of its junctions forward-biased thereby providing a low impedance voltage source to the bus 250. Since the first reference input voltage $V_{ref\_1}$ is the lesser one of the two reference signals, the collector-to-base junction of the first output transistor 222 is still in a reverse-biased condition, therefore providing a high impedance to the bus 250 and sufficiently isolating the first set point selection circuit 220 from the bus 250.

A fault condition in the first reference input voltage $V_{ref\_1}$ would typically cause it to move closer to zero making its isolation from the bus 250 even more pronounced. Should the second reference input voltage $V_{ref\_2}$ be the reference signal to experience a fault condition, the first reference input voltage $V_{ref\_1}$ would assume control of the bus 250. Margin up/down voltage signals are typically superimposed on both the first and second reference input voltages $V_{ref\_1}$, $V_{ref\_2}$ simultaneously thereby changing the overall value of the global set point voltage signal $V_{global}$ but not the selection of the greater one of the reference signals.

In summary, the power system as presented in the discussion above presents the advantages of automatic selection of the highest voltage set point dictated by the individual controllers, high impedance bus characteristics that resist bus failure if one or more (but not all) of the DC-DC converter controllers fail and allowing margin up/down adjustments. Even under the condition of both the DC-DC converter controllers malfunctioning, the global set point voltage signal bus can still shield the fault condition from affecting the DC-DC converters, thus maintaining the integrity of the power system with the output voltage assuming the default value of DC-DC converters.

Although the present invention has been described in detail, those skilled in the art should understand that they can make various changes, substitutions and alterations herein without departing from the spirit and scope of the invention in its broadest form.

What is claimed is:

1. An interface circuit for allowing first and second power converter systems to function in parallel, comprising:
    a set point selection circuit, coupled to first and second converter controllers of said first and second power converter systems, respectively, that selects one of said first and second power converter systems to provide a global set point voltage signal; and
    a bus, coupled to said set point selection circuit, that conveys said global set point voltage signal to said first and second power converter systems, said set point selection circuit isolating a nonselected one of said first and second converter controllers from said bus.

2. The interface circuit as recited in claim 1 wherein said global set point voltage signal is an analog signal.

3. The interface circuit as recited in claim 1 wherein said first and second converter controllers employ said global set point voltage signal to control an output voltage of said first and second power converter systems, respectively.

4. The interface circuit as recited in claim 1 wherein a top level controller is coupled to said first and second converter controllers, said top level controller providing an AC-DC conversion control signal.

5. The interface circuit as recited in claim 1 wherein a top level controller is coupled to said first and second converter controllers, a battery monitoring circuit coupled to said top level controller monitoring a characteristic of a battery couplable to said top level controller.

6. The interface circuit as recited in claim 1 wherein each of said first and second power converter systems comprises at least two DC-DC power converters.

7. The interface circuit as recited in claim 1 wherein each of said first and second converter controllers controls multiple DC-DC power converters contained in said first and second power converter systems, respectively.

8. A method of operating first and second power converter systems in parallel, comprising:
    selecting one of first and second converter controllers of said first and second power converter systems to provide a global set point voltage signal;
    conveying said global set point voltage signal to said first and second power converter systems with a bus; and
    isolating a nonselected one of said first and second converter controllers from said bus.

9. The method as recited in claim 8 wherein said global set point voltage signal is an analog signal.

10. The method as recited in claim 8 further comprising employing said set point voltage signal to control an output voltage of said first and second power converter systems, respectively.

11. The method as recited in claim 8 further comprising further providing an AC-DC conversion control signal.

12. The method as recited in claim 8 further comprising monitoring a characteristic of a battery couplable to a top level controller.

13. The method as recited in claim 8 wherein each of said first and second power converter systems comprises at least two DC-DC power converters.

14. The method as recited in claim 8 further comprising controlling, with each of said first and second converter controllers, multiple DC-DC power converters contained in said first and second power converter systems, respectively.

15. A power supply, comprising:
    a first power converter system controlled by a first DC-DC converter controller and having at least two power converters therein;
    a second power converter system controlled by a second DC-DC converter controller and having at least two power converters therein; and
    an interface circuit for operating said first and second power converter systems in parallel, including:
        a set point selection circuit, coupled to said first and second DC-DC converter controllers, that selects one of said first and second power converter systems to provide a global set point voltage signal, and
        a bus, coupled to said set point selection circuit, that conveys said global set point voltage signal to said first and second power converter systems, said set point selection circuit isolating a nonselected one of said first and second DC-DC converter controllers from said bus.

16. The power supply as recited in claim 15 wherein said global set point voltage signal is an analog signal.

17. The power supply as recited in claim 15 wherein said first and second controllers employ said set point voltage signal to control said at least two power converters of said first and second power converter systems, respectively.

18. The power supply as recited in claim 15 wherein a top level controller is coupled to said first and second power converter systems.

19. The power supply as recited in claim 15 further comprising a battery monitoring circuit that monitors a characteristic of a battery couplable to said first and second power converter systems.

20. The power supply as recited in claim 15 wherein each of said first and second DC-DC converter controllers controls said at least two power converters in said first and second power converter systems.

* * * * *